US005463522A

United States Patent [19]

Van Wagener et al.

[11] Patent Number: 5,463,522

[45] Date of Patent: Oct. 31, 1995

[54] HOUSING AND MOUNTING ARRANGEMENT FOR THERMAL PROTECTOR DEVICE

[75] Inventors: Raymond H. Van Wagener, Darien, Conn.; Lothar Freimuth, Franklin Lakes; Michael A. Stein, Wayne, both of N.J.

[73] Assignee: MagneTek, Inc., Los Angles, Calif.

[21] Appl. No.: 98,471

[22] Filed: Jul. 27, 1993

[51] Int. Cl.[6] .......... H02H 5/04

[52] U.S. Cl. .......... 361/103; 361/37

[58] Field of Search .......... 361/22, 24, 25, 361/26, 27, 31, 32, 38, 103, 105, 106; 337/112, 113, 372, 380, 381, 398; 174/52.1; 439/621, 622; 310/686, 71; 200/289, 293, 294, 303, DIG. 27, DIG. 28

[56] References Cited

U.S. PATENT DOCUMENTS 3,838,213 9/1974 Georgopulos et al. .......... 174/52.1
4,112,405 9/1978 Joseph .......... 361/25
4,188,553 2/1980 Wheaton .......... 361/25
4,335,270 6/1982 Holce et al. .......... 174/52.1
4,335,368 6/1982 Givler .......... 337/372
4,604,673 8/1986 Schoendube .......... 361/38
4,791,329 12/1988 Ubukata et al. .......... 337/380
4,861,943 8/1989 Yarmark .......... 174/52.1
5,126,510 6/1992 Bauer et al. .......... 337/380

*Primary Examiner*—A. D. Pellinen
*Assistant Examiner*—Ronald W. Leja
*Attorney, Agent, or Firm*—Darby & Darby

[57] ABSTRACT

A housing of electrical insulating material for a thermal protector used with an inductive device, such as a ballast transformer, in which the housing has an open portion through which the case of the thermal protector is accessible to be placed adjacent a part of the inductive device to sense its temperature. The housing also has an aperture through which a current carrying inductor device lead wire connected to the protector extends. An adhesive tape on the housing is used to fasten the housing to the inductor. An insulated part of the housing protects a junction of a current carrying wire connected to the protector and a wire of a coil of the inductive device.

13 Claims, 3 Drawing Sheets

HOUSING AND MOUNTING ARRANGEMENT FOR THERMAL PROTECTOR DEVICE

BACKGROUND OF THE INVENTION

The present invention relates to a housing and mounting arrangement for a thermal protector device which is used for protecting various electrical apparatus, such as ballasts for fluorescent lamps and electric motors.

The use of thermal protector devices with various types of electrical equipment is well known. Such devices are thermal sensors which are usually placed in series with the power lead to interrupt the supply of current to the electrical equipment when its temperature exceeds a certain unsafe level. In a typical application, for example a ballast transformer for a fluorescent lamp, such thermal protector is located in a housing which insulates it from contact with any current carrying parts of the transformer and placed in close proximity to a portion of the transformer, for example one of its windings, to sense its temperature. Normally, the thermal protector, which can be in a metal casing, is placed in direct contact with the transformer coil for direct sensing of the coil temperature. If the temperature becomes excessive, the protector opens and the supply of current to the transformer is terminated.

Various arrangements have been provided for holding the thermal protector in proximity to the electrical equipment. For example, in U.S. Pat. Nos. 5,126,510 to Bauer and 4,861,943 to Yarmark, an open ended housing of insulating material is provided. The thermal protector device is inserted into the housing open end until it abuts a stop within the housing. The housing is provided with spring-like fingers which snap onto a part of the electrical equipment, such as a metal plate, whose temperature is to be sensed with the bottom wall of the housing being against the metal plate. The two leads from the thermal protector extend through the housing open end in the same direction and are wired into the leads of the electrical apparatus.

While such arrangements are operative, they are somewhat expensive from the point of view of manufacture of a housing with the snap-in arrangement, the use of a metal plate to accept the snap-in fingers and the assembly of the housing to the plate.

In housings for thermal protector devices shown in patents such as Snider U.S. Pat. Nos. 3,537,052, Kandpal 4,061,935, Gibler 4,335,368, Hauser 4,734,602, Ubukata 4,791,329, Campolo 4,694,223 and Hoffass 4,887,063, the insulated housings are closed and are merely placed close to or against the element whose temperature is to be sensed.

BRIEF DESCRIPTION OF THE INVENTION

The present invention relates tea novel housing of insulating material for a thermal protector device which is of simplified construction and which provides a more efficient arrangement for mounting the housing and the protector device adjacent to a part of the electrical apparatus. A housing is provided which can be mounted directly on a current carrying lead wire of the electrical apparatus with which the thermal protector device is associated. The protector device itself can be in a metallic housing, as is common. In accordance with the invention, the housing has openings to permit the passage of the lead wire on an in-line basis. The protector device is inserted into the housing through one of the openings and a connection made between its leads to each of the parts of the apparatus current carrying lead wire. One side of the housing is open to permit insertion of the protector device, passage of the lead wire and exposure of a part of the protector device against the part of the electrical apparatus whose temperature is to be sensed. If desired, a double sided adhesive tape can be used to fasten the housing to a part of the electrical apparatus. Also, the housing itself is mounted on the apparatus current supply lead.

The present invention provides adequate insulation for the protector device which is wired in series with the apparatus current carrying power lead. The housing also permits a part of the thermal protector device to be mounted directly against the part of the electrical apparatus whose temperature condition is to be sensed rather than being separated from the part by the insulated housing. In addition, the housing can conform to the geometrical dimensions of the electrical apparatus to be protected. It also cannot be removed without damaging the electrical apparatus and also provides strain relief for the leads of the thermal protector.

OBJECTS OF THE INVENTION

An object of the invention is to provide a novel housing for a thermal protector device used to protect an electrical apparatus.

Another object is to provide a housing for a thermal protector which affords easy assembly of the thermal protector and housing to the electrical apparatus.

A further object is to provide a housing for a thermal protector in which a current carrying lead to which the thermal protector is electrically connected enters and exits the housing and strain relief is provided for such lead.

An additional object is to provide a housing for a thermal protector device having an open side through which a thermal protector of the type mounted in a casing is inserted and which permits the protector casing to be in direct contact with a part of the electrical apparatus whose temperature is being sensed.

An additional object is to provide a housing for a thermal protector device having an open side through which a thermal protector and a hole in an opposite wall through which a current carrying lead connected to the protector passes so that the housing is mounted on the lead.

BRIEF DESCRIPTION OF DRAWINGS

Other objects and advantages of the present invention will become more apparent upon reference to the following specification and annexed drawings in which.

DETAILED DESCRIPTION OF THE INVENTION

Figure 1:
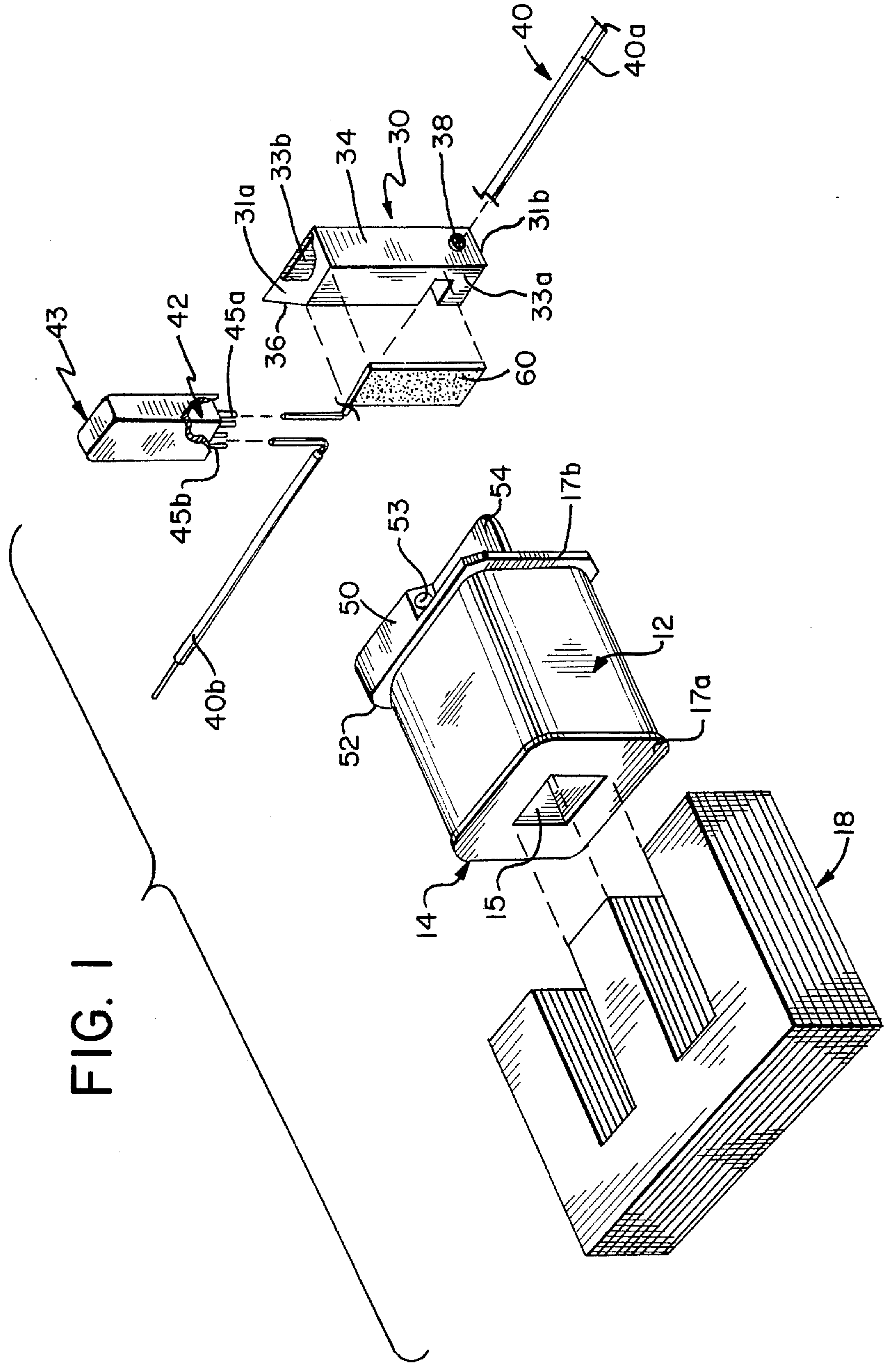
FIG. 1 is an exploded perspective view of the invention as related to a wound coil on a bobbin.

Referring to FIG. 1, there is shown a part of a transformer with which the present invention is used. The transformer has a coil winding 12 on a bobbin 14 of insulating material and of conventional construction with a hollow core 15 and side walls 17*a*, 17*b*. The bobbin 14 with the coil 12 wound thereon is held within a stack of laminations 18 of any suitable size and shape. Such a construction for a transformer is conventional.

The thermal protector housing 30 is of generally rectangular shape having upper and lower walls 31*a*, 31*b*, front and back walls 33*a*, 33*b* and one side wall 34 which connects the upper and lower walls and the front and back walls. Between the front and back walls 31*a*, 31*b* and opposite to the side wall 34, the housing is open at 36. The housing back wall 31*b* is of greater width than the front wall 31*a* so that the opening 36 into the housing is slanted for a purpose to be later described. Side wall 34 also has an aperture 38 through which one part of a current carrying lead wire 40 of the transformer can pass.

Housing 30 has a hollow interior of a size which can accommodate a thermal protector device 42 which can be within its own protector casing 43, which is usually of metal. Any suitable type of thermal protector device can be utilized with the present invention. The thermal protector device 42 has leads 45*a*, 45*b* so that it can be connected in series with the transformer current carrying lead 40. That is, lead 40 is cut forming parts 40*a*, 40*b* and the thermal protector device 42 is connected in series with the two parts. As seen, the connection between the current carrying lead 40 and the terminals 45*a*, 45*b* of the protector device is preferably made at a sharp right angle.

In use the thermal protector device 42 is assembled in series, such as by soldering, with the two parts of the current carrying lead wire 40. Part 40*a* of the lead wire is passed through the housing entrance opening 36 and the hole 38 in the side wall 34. Thereafter, the protector device 42 is moved into the housing interior through the entrance opening 36, by either moving the housing and/or the protector.

The uninsulated end of the lead wire part 40*b* connected to protector terminal 45*b* is to supply current to the coil 12 on the bobbin 14. Accordingly, there must be a connection between such end and the magnet wire of coil 12. This is usually accomplished by twisting the uninsulated end of lead part 40*b* and the coil wire together and then soldering them. The connected lead wire and magnetic coil wire ends must be insulated after soldering. This is accomplished by providing on the bobbin end wall 17*b* a tunnel 50 having an open end 52 and either an open opposite end or an end with an opening 53. The bottom wall of the tunnel has a chute 54.

Figure 2:
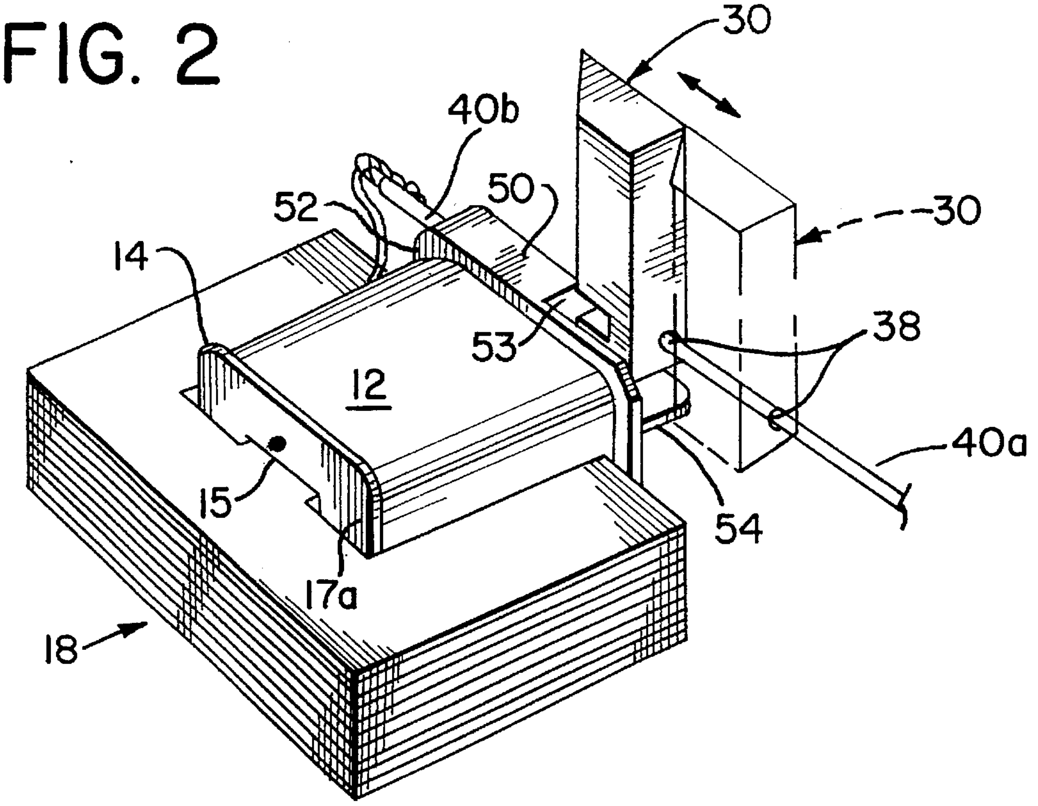
FIG. 2 is a perspective view of the embodiment of FIG. 1 in a further assembly stage.

In the assembly procedure, as shown in FIG. 2, the subassembly of the uninsulated end of current carrying lead wire part 40*b* and coil 12 wire is accomplished by extending the uninsulated end into the tunnel 50 chute 54 through the opening 53 and out the tunnel open end wall 52. The uninsulated end of the current carrying wire 40*b* and the coil magnet wire is soldered while extending out of the tunnel open end. At this point, the housing 30 with the protector 42 therein is close to the entrance way 53 of tunnel 50.

Figure 3:
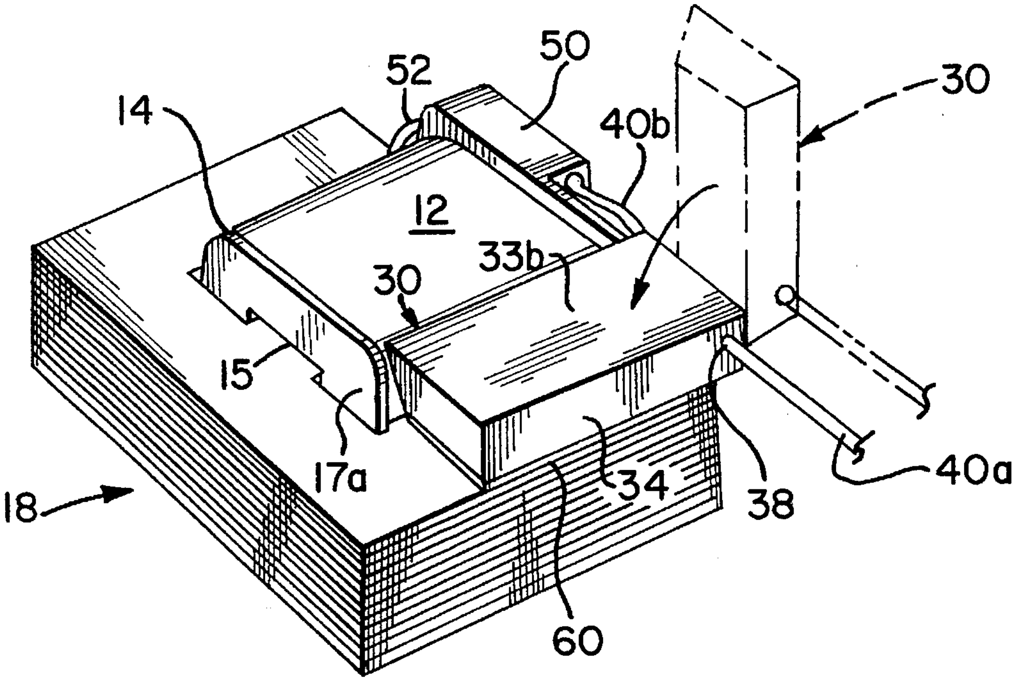
FIG. 3 is a further perspective view of the embodiment of FIG. 1 showing the thermal protector device housing mounted to the transformer.

After the soldering of the magnet wire and current carrying lead wire is completed, they are bent back by 180° for strain relief. Lead wire 40 is then pulled back from the tunnel 50 this retracting the soldered ends into the tunnel for insulation protection. Thereafter, as shown in FIG. 3, the housing 30 is moved downwardly so that its back wall 33*b* rests against the top lamination of the lamination stack 18. The open side 36 of the housing 30 is opposite the coil 12 and, because of the slant of the opening, generally conforms to the shape of coil 12. Accordingly, the housing can be placed very close to the coil 12 with the side edge of the casing of protector 42 in direct contact with the coil for direct heat transfer from the coil to the protector. If the coil 12 overheats, this is sensed by the protector 42 within the housing 30, the protector opens and the current supply to the transformer is interrupted.

If desired, a piece of double faced tape 60 can be applied to the housing back wall 33*b*. This can hold the housing 30 to the lamination stack 18.

With the housing 30 having the thermal protector 42 therein mounted on the lamination stack 18, the unit is impregnated with varnish. This permanently affixes the protector housing assembly in place. Since the lead wire part 40*a* passes through the hole 38 in the housing, strain relief is provided for the lead wire to protect it against breakage or pullout. The housing 30 is effectively mounted on the lead wire and lamination with the protector casing in direct contact with the transformer coil 12.

Figure 4A:
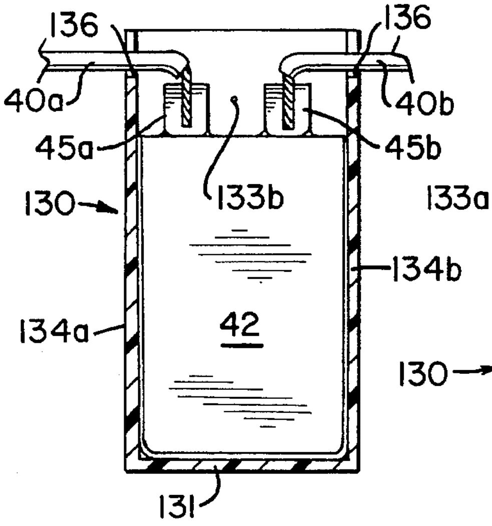
FIGS. 4A and 4B are front and side views, in section, of a further embodiment of the protector housing.
Figure 4B:
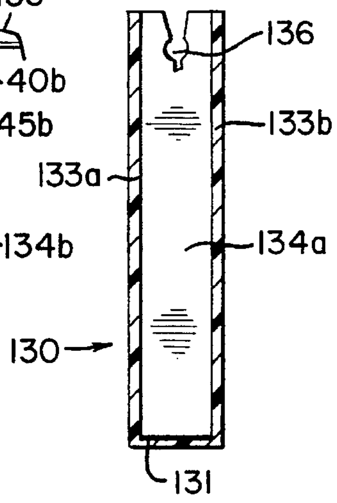

FIGS. 4A and 4B show a further embodiment of the invention wherein the housing 130 for the protector 42 is of generally rectangular shape with a bottom wall 131, front and back walls 133*a*, 133*b* and side walls 134*a*, 134*b*. The top of housing 130 is open. Each of the side walls 134*a*, 134*b* has a notch 136 at the top. As seen in FIG. 4A, the thermal protector 40 is inserted into the housing 130 from the open top with the lead wire parts 40*a*, 40*b* extending into the notches 136 in the side walls 134*a*, 134*b*. In this arrangement, when the housing 130 is placed on the transformer, there is no direct contact between any part of the transformer and the thermal protector device. That is, a transfer occurs through the front (or back) wall 133. Accordingly, such wall preferably should be made relatively thin to provide for better heat transfer.

Figure 4C:
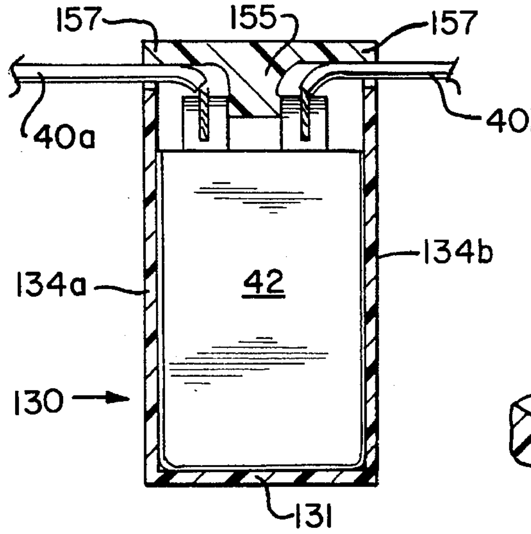
FIG. 4C is a front view of yet another embodiment of the housing showing a plug.

If desired, as seen in FIG. 4C, a plug 155 can be placed into the open upper end of the housing 130. Plug 155 has arms 157 which extend into the notches 136 in the housing side walls to hold the wires 40*a*, 40*b* in place.

Figure 5:
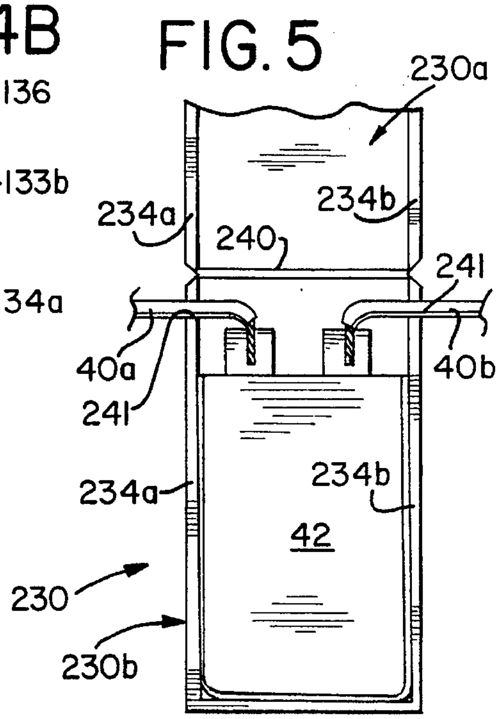
FIG. 5 is a plan view of another embodiment of the housing using two hinged sections.

FIG. 5 shows another embodiment of the invention wherein the housing 230 is made as one piece but with two sections 230*a* and 230*b* which are connected by a living hinge 240. Each of the sections 230*a*, 230*b* has peripheral walls extending outwardly therefrom which define side walls 234*a*, 234*b*. In the side walls 234*a*, 234*b* of section 230*b*, an opening 241 is provided through which the lead wire parts 40*a*, 40*b* extend.

In using the housing of FIG. 5, the thermal protector 42 is placed within the walls 234*a*, 234*b* of the lower section 230*b*. The upper section 230*a* is folded on the living hinge 240 and the two sections are fastened together. This can be accomplished by making the wall portions 234*a*, 234*b* of the sections 230*a* and 230*b* interfit, have a snap fit arrangement, e.g., a groove in one wall section and a corresponding fitting portion in the other section, use of an adhesive, ultrasonic welding, etc.

Figure 6A:
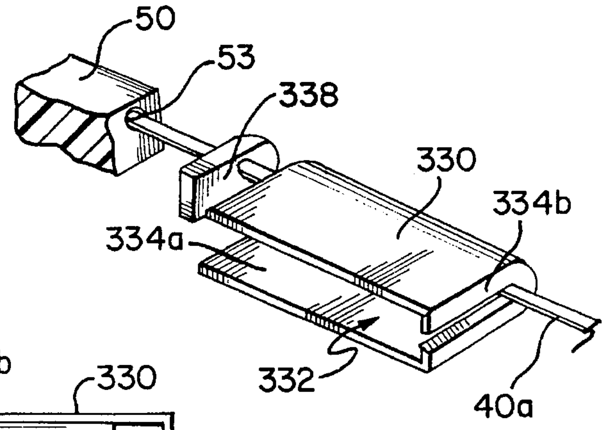
FIGS. 6A and 6B show another embodiment of the invention which is useful for choke type electrical devices.
Figure 6B:
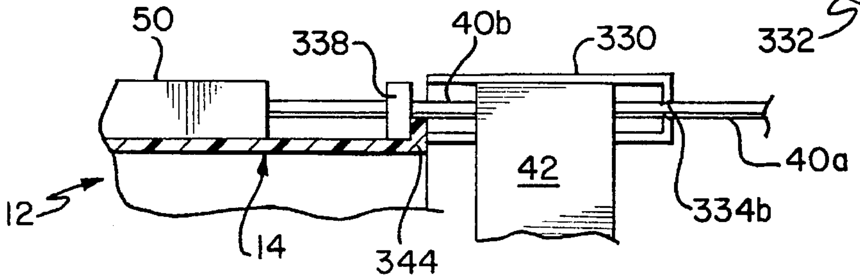

FIGS. 6A and 6B show another embodiment of the invention which is useful for choke type electrical devices. Here, the housing 330 is generally U-shaped with an open front 330 and one open side 334*a*. The other side has a peripheral wall 334*b* leaving an opening.

The thermal protector 42 is electrically connected in series with the lead wire parts 40*a*, 40*b*. Connected to lead wire part 40*b* is a locking key, which can be a molded plastic piece which is fit on the insulated lead 40*b* and thereafter crimped in place. There is also a further extension of lead 40*b* and a mounting flange 340.

As shown in FIG. 6B, the protector device 42 is within the housing 330. A mounting lug 344 is provided on the upper lamination. The lug 344 fits into the space between the locking key 338 and the housing 330. The flange 340 is placed on top of the lamination. Because of the presence of the locking key 338 and the interfitting lug and flange, the housing 330 is held in place against the appropriate part of the choke.

What is claimed is:

1. The combination comprising:

an electrical thermal protector device in a metal container having top and bottom ends for use with an electrical unit, a lead wire having one of its ends connected to said thermal protector at one of said container top and bottom ends, the other end of said lead wire adapted for connection for supplying current to the unit, a housing of electrical insulating material having front and back walls, and only one side wall and at least one of an upper and lower wall connecting said front and back walls to form a hollow housing with an open area opposite said one side wall, said open area having a length at least equal to the distance between said protector device metal container top and bottom ends and through which said protector device metal container is placed into said housing, the thermal protector device container fitting within said hollow housing with a portion of its metal container exposed through and extending outwardly of said housing open area, an opening in said one side wall through which said lead wire other end extends.

2. The combination of claim 1 wherein there are a pair of lead wires each having one of its ends connected to said thermal protector device at said one container end, the other end of one said lead wire extending through said opening of said one side wall and the other end of said other lead wire extending through said open area of said housing opposite said one side wall.

3. The combination of claim 1 wherein one of said housing front and back walls is wider than the other to make said open area of said housing opposite said one side wall angled, a part of said thermal protector metal container extending through said housing open area and overlying the narrower one of said front and back walls and being exposed to physically contact a part of the electrical unit.

4. The combination of claim 1 further comprising a piece of double face adhesive tape on said housing back wall for attaching said housing to said unit.

5. The combination of claim 2 wherein one of said housing front and back walls is wider than the other to make said open area of said housing opposite said one side wall angled, a part of the thermal protector metal container within said housing extending therethrough and overlying the narrower of said housing front and back walls and exposed to contact a part of the electrical unit.

6. The combination of claim 5 further comprising a piece of double face adhesive tape on said housing back wall for attaching said housing to said unit.

7. The combination of claim 2 wherein said electrical unit comprises a transformer having a bobbin and a coil of wire wound thereon, said bobbin having an external housing of insulating material forming a tunnel, said other end of said other lead wire from said protector device extending through said open area of said housing opposite said one side wall also extending into said bobbin housing tunnel, said other end of said other lead wire remote from said protector device connected to a wire of said coil and the connection of said other lead wire other end and coil wire being located within said bobbin housing tunnel.

8. The combination of claim 7 wherein one of said housing front and back walls is wider than the other to make said open area of said housing opposite said one side wall angled, a part of said thermal protector metal container extending therethrough and extending beyond the narrower one of said front and back walls, said housing located relative to said unit to place said part of said thermal protector metal container extending through said housing open area in contact with a part of the electrical unit.

9. The combination of claim 8 wherein said transformer bobbin has a side wall, said bobbin housing being attached to one end of said bobbin side wall, and an insulating piece on said bobbin side wall between said thermal protector housing and said bobbin housing.

10. The combination comprising:

an electrical thermal protector device in a metal container for use with an electrical unit, a pair of lead wires each having one of its ends connected to said thermal protector at one end thereof and its other end adapted for connection for supplying electrical current to the unit, a housing of insulating material having front and back walls, opposing side walls connecting said front and back walls and an open top through which said protector device metal container is inserted into said housing with said pair of lead wires extending from said protector device in a direction out of said open top, a notch at the top of each side wall into which a respective lead wire from said protector fits and exits from said housing.

11. The combination of claim 10 further comprising a plug to fit into said housing open top, said plug having an arm at each side thereof to fit into a respective one of said side wall notches to overlie and hold the lead wire therein.

12. The combination comprising:

an electrical thermal protector device in a metal container for use with an electrical unit, a pair of lead wires each having one of its ends connected to said thermal protector at one end thereof and its other end adapted for connection for supplying electrical current to the unit, a housing formed of two sections connected by a hinge, one of said sections forming a top and back walls, the other of said sections forming a bottom and front walls, and at least one of said sections having opposing peripheral side walls, said hinge for pivotally moving said sections together to form a hollow housing between said side walls to hold the thermal protector device metal container, and an opening in each of said side walls through which one of said lead wires extends to exit said housing.

13. The combination of claim 12 wherein each of said sections has peripheral opposing side walls that mate, said opening through which a lead wire extends located in each of the peripheral opposing side walls of one or both of said sections.

* * * * *